United States Patent
Ma (10) Patent No.: US 11,252,020 B2
(45) Date of Patent: Feb. 15, 2022

(54) SERVICE REGION MANAGEMENT METHOD AND APPARATUS

(71) Applicant: Huawei Technologies Co., Ltd., Shenzhen (CN)

(72) Inventor: Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/100,098

(22) Filed: Nov. 20, 2020

(65) Prior Publication Data

US 2021/0075668 A1 Mar. 11, 2021

Related U.S. Application Data

(63) Continuation of application No. PCT/CN2019/087979, filed on May 22, 2019.

(30) Foreign Application Priority Data

May 22, 2018 (CN) .......................... 201810495845.0

(51) Int. Cl.
| | |
|---|---|
| *G06F 15/173* | (2006.01) |
| *H04L 12/24* | (2006.01) |
| *H04L 29/08* | (2006.01) |

(52) U.S. Cl.
CPC ...... *H04L 41/0686* (2013.01); *H04L 67/1097* (2013.01)

(58) Field of Classification Search
CPC . H04L 41/0686; H04L 67/1097; H04L 67/16; H04L 41/0893; H04L 41/50; H04W 88/18; H04W 60/00

(Continued)

(56) References Cited

U.S. PATENT DOCUMENTS

| | | | |
|---|---|---|---|
| 10,999,787 B2 * | 5/2021 | Dao | H04W 36/0009 |
| 2017/0135031 A1 * | 5/2017 | Buckley | H04W 48/16 |

(Continued)

FOREIGN PATENT DOCUMENTS

| | | |
|---|---|---|
| CN | 102301796 A | 12/2011 |
| CN | 104581946 A | 4/2015 |

(Continued)

OTHER PUBLICATIONS

"23.501: SMF Service Areas," Source: Ericsson, Document for: Approval, Agenda Item: 6.5.3, Work Item / Release:, SA WG2 Meeting #121, May 15-19, 2017, Hangzhou, China, 13 pages.

(Continued)

*Primary Examiner* — Liang Che A Wang
(74) *Attorney, Agent, or Firm* — Slater Matsil, LLP (57) ABSTRACT

A service region management method and apparatus. The method includes sending, by a network management system, a first message to a network storage network element, the first message including identification information of a network function region and information about a service region corresponding to the network function region, and the first message is used to request to register the network function region, receiving, by the network storage network element, the first message storing, by the network storage network element, the identification information of the network function region and the information about the service region, and sending, by the network storage network element, notification information to the network management system, the notification information notifying that registration of the network function region is completed, receiving, by the network management system, the notification information.

10 Claims, 3 Drawing Sheets

(58) Field of Classification Search
USPC .................................. 709/206, 223, 224
See application file for complete search history.

(56) References Cited

U.S. PATENT DOCUMENTS

| | | | |
|---|---|---|---|
| 2018/0041936 A1* | 2/2018 | Kim | H04L 5/0053 |
| 2019/0200243 A1* | 6/2019 | Anand | H04W 4/24 |
| 2019/0261260 A1* | 8/2019 | Dao | H04W 48/18 |
| 2019/0274082 A1* | 9/2019 | Vemuri | H04M 7/0057 |
| 2020/0170055 A1* | 5/2020 | Dou | H04W 60/005 |

FOREIGN PATENT DOCUMENTS

| | | | |
|---|---|---|---|
| CN | 107770815 A | * | 3/2018 |
| CN | 107770815 A | | 3/2018 |
| WO | 2017082996 A1 | | 5/2017 |
| WO | 2018085713 A2 | | 5/2018 |

OTHER PUBLICATIONS

"Pseudo-CR on NF Service Discovery and Selection Requirements," Source: Nokia, Alcatel-Lucent Shanghai Bell, Verizon, AT&T, Spec: 3GPP TR 29.891 v0.3.0, Agenda item: 6.2.1, Document for: Decision, 3GPP TSG CT4 Meeting #79, C4-174329, Krakow, Poland; Aug. 21-25, 2017, 4 pages.

"NF-Discovery via the NKF," Source to WG: Nokia, Nokia Shanghai Bell, Verizon, AT&T, source to TSG: S2, Work item code: 5G_Ph1, Category: F, Date: Apr. 7, 2018, Release: Rel-15, 3GPP TSG-SA2 Meeting #127, S2-183254, Sanya, China, Apr. 16, 2018-Apr. 20, 2018, 3 pages.

"Solution for the Optimization for Profile of NF/NF Service Instance," Source: Huawei, HiSilicon, Document for Discussion and approval, Agenda Item: 6.19, Work Item / Release: FS_eSBA / Rel-16, SA WG2 Meeting #128, S2-186820, (revision of S2-18xxxx), Jul. 2-6, 2018, Vilnius, Lithuania, 2 pages.

* cited by examiner

SERVICE REGION MANAGEMENT METHOD AND APPARATUS

CROSS-REFERENCE TO RELATED APPLICATIONS

This application is a continuation of International Application No. PCT/CN2019/087979, filed on May 22, 2019. The International Application claims priority to Chinese Patent Application No. 201810495845.0, filed on May 22, 2018. The disclosures of the aforementioned applications are hereby incorporated by reference in their entireties.

TECHNICAL FIELD

This application relates to the field of mobile communications technologies, and in particular, to a service region management method and apparatus.

BACKGROUND

Currently, in a fifth generation (5G) network architecture, a network repository function (NRF) network element stores information about a service region corresponding to a deployed network element, to indicate a network area served by the network element. A 5G network supports network virtualization deployment and on-demand service elasticity. A quantity of to-be-deployed network elements increases, and during network scale-out or scale-in, a to-be-deployed network element is deployed or a network element that has been deployed is undeployed. During network element deployment, information about a corresponding service region can be placed in description information (Network Function profile) of the network element.

A current service region management method based on a granularity of a network element causes network element deployment and management to be complex.

SUMMARY

This application provides a service region management method and apparatus, to implement simplified management on a service region.

In this application, a concept of a network function region (network function region) is introduced. The network function region is used to manage a service region of a network element deployed in a network. One or more network elements belonging to a same network function region correspond to a same service region, that is, network elements in a same network function region serve a same service region. One network function region corresponds to one or more service regions. When service regions served by network elements of one or more types are the same as a service region corresponding to one network function region, the network element may belong to the network function region, and the service region served by the network element is the service region corresponding to the network function region. For example, service regions served by network elements deployed in a same data center may be the same. In this case, these network elements may belong to a same network function region, and the service region may be, for example, a network tracking area (TA), or may be a network area of another type.

According to a first aspect, this application provides a service region management method. The method includes sending, by a network management system, a first message to a network storage network element, where the first message includes identification information of a network function region and information about a service region corresponding to the network function region, and the first message is used to request to register the network function region, and receiving, by the network management system, notification information from the network storage network element, where the notification information is used to notify that registration of the network function region is completed. Based on this solution, the network management system sends the first message to the network storage network element, to request to register the network function region with the network storage network element, so that the network storage network element manages the network function region and the service region corresponding to the network function region. Therefore, the identification information of the network function region can be subsequently used to indicate one or more service regions corresponding to the network function region, thereby simplifying a service region management manner.

In a possible implementation, the network management system sends a second message to the network storage network element, where the second message includes the identification information of the network function region and information about an updated service region corresponding to the network function region, and the second message is used to request to update the network function region. Based on this solution, when the service region corresponding to the network function region is to be updated, the network management system may request the network storage network element to update the service region corresponding to the network function region.

In a possible implementation, the information about the service region includes identification information of at least one tracking area. In other words, the information about the service region may include identification information of one or more tracking areas.

According to a second aspect, this application provides a service region management method. The method includes receiving, by a network storage network element, a first message from a network management system, where the first message includes identification information of a network function region and information about a service region corresponding to the network function region, and the first message is used to request to register the network function region, storing, by the network storage network element, the identification information of the network function region and the information about the service region, and sending, by the network storage network element, notification information to the network management system, where the notification information is used to notify that registration of the network function region is completed. Based on this solution, the network storage network element receives the first message sent by the network management system, where the first message is used to request to register the network function region with the network storage network element, so that the network storage network element manages the network function region and the service region corresponding to the network function region. Therefore, the identification information of the network function region can be subsequently used to indicate one or more service regions corresponding to the network function region, thereby simplifying a service region management manner.

In a possible implementation, the network storage network element may further receive a second message from the network management system, where the second message includes the identification information of the network function region and information about an updated service region corresponding to the network function region, and the second message is used to request to update the network function region, and storing, by the network storage network element, the information about the updated service region. Based on this solution, when the service region corresponding to the network function region is to be updated, the network management system may request the network storage network element to update the service region corresponding to the network function region.

In a possible implementation, the information about the service region includes identification information of at least one tracking area. In other words, the information about the service region may include identification information of one or more tracking areas.

According to a third aspect, this application provides a service region management method. The method includes sending, by a first network element, a third message to a network storage network element, where the third message includes identification information of a network function region to which the first network element belongs, and the third message is used to request to register the first network element, and receiving, by the first network element, notification information from the network storage network element, where the notification information is used to notify that registration of the first network element is completed. Based on this solution, when the first network element intends to register with the network storage network element, the identification information of the network function region may be carried in the third message, and then the network function region stores the identification information of the network function region of the first network element, to complete registration of the first network element. The third message needs to carry only the identification information of the network function region, and does not need to carry information about one or more service regions served by the network element. Therefore, a registration procedure of the first network element can be simplified, and a manner of managing the service region by the network storage network element can further be simplified.

According to a fourth aspect, this application provides a service region management method. The method includes sending, by a second network element, a fourth message to a network storage network element, where the fourth message includes a type of a network function and information about a service region, and the fourth message is used to request to obtain information about a network element that serves the service region and that supports the type of the network function, and receiving, by the second network element, information about a third network element from the network storage network element, where the third network element is the network element that serves the service region and that supports the type of the network function. Based on this solution, when the second network element intends to request to obtain the information about the network element that serves the service region and that supports the type of the network function, the second network element may send the fourth message to the network storage network element, where the fourth message includes the type of the network function and the information about the service region. Therefore, the network storage network element may obtain, based on the type of the network function and the information about the service region, the information about the network element that serves the service region and that supports the type of the network function, and send the information to the second network element.

According to a fifth aspect, this application provides a service region management method. The method includes receiving, by a network storage network element, a third message from a first network element, where the third message includes identification information of a network function region to which the first network element belongs, and the third message is used to request to register the first network element, storing, by the network storage network element, the identification information of the network function region, and sending, by the network storage network element, notification information to the first network element, where the notification information is used to notify that registration of the first network element is completed. Based on this solution, when the first network element intends to register with the network storage network element, the identification information of the network function region may be carried in the third message, and then the network function region stores the identification information of the network function region of the first network element, to complete registration of the first network element. The third message needs to carry only the identification information of the network function region, and does not need to carry information about one or more service regions served by the network element. Therefore, a registration procedure of the first network element can be simplified, and a manner of managing the service region by the network storage network element can further be simplified.

In a possible implementation, the network storage network element may further receive a fourth message from a second network element, where the fourth message includes a type of a network function and information about a service region, and the fourth message is used to request to obtain information about a network element that serves the service region and that supports the type of the network function, the network storage network element determines identification information of a network function region corresponding to an identifier of the service region, the network storage network element determines, based on the identification information of the network function region, information about a network element that is in the network function region and that supports the type of the network function, and the network storage network element sends information about a third network element to the second network element, where the third network element is the network element that is in the network function region and that supports the type of the network function. Based on this solution, when the second network element intends to request to obtain the information about the network element that serves the service region and that supports the type of the network function, the second network element may send the fourth message to the network storage network element, where the fourth message includes the type of the network function and the information about the service region. Therefore, the network storage network element may obtain, based on the type of the network function and the information about the service region, the information about the network element that serves the service region and that supports the type of the network function, and send the information to the second network element.

According to a sixth aspect, this application provides an apparatus. The apparatus may be a network management system, a network storage network element, a first network element, or a second network element, or may be a chip. The apparatus has a function of implementing the embodiments of any one of the first aspect, the second aspect, the third aspect, the fourth aspect, or the fifth aspect. The function may be implemented by hardware, or may be implemented by hardware executing corresponding software. The hardware or the software includes one or more modules corresponding to the foregoing function.

According to a seventh aspect, an apparatus is provided, including a processor and a memory. The memory is configured to store a computer-executable instruction. When the apparatus runs, the processor executes the computer-executable instruction stored in the memory, so that the apparatus performs the service region management method according to any one of the first aspect or the possible implementations of the first aspect, or the apparatus performs the service region management method according to any one of the second aspect or the possible implementations of the second aspect, or the apparatus performs the service region management method according to any one of the third aspect or the possible implementations of the third aspect, or the apparatus performs the service region management method according to any one of the fourth aspect or the possible implementations of the fourth aspect, or the apparatus performs the service region management method according to any one of the fifth aspect or the possible implementations of the fifth aspect.

According to an eighth aspect, this application further provides a computer-readable storage medium. The computer-readable storage medium stores an instruction, and when the instruction is run on a computer, the computer is enabled to perform the methods according to the foregoing aspects.

According to a ninth aspect, this application further provides a computer program product including an instruction. When the computer program product runs on a computer, the computer is enabled to perform the methods according to the foregoing aspects.

According to a tenth aspect, this application further provides a system. The system includes the network management system in the first aspect and the network storage network element in the second aspect.

According to an eleventh aspect, this application further provides a system. The system includes the first network element in the third aspect and the network storage network element in the fifth aspect. Further, the system may further include the second network element in the fourth aspect.

These aspects or other aspects in this application are clearer and easier to understand in descriptions of the following embodiments.

DETAILED DESCRIPTION OF ILLUSTRATIVE EMBODIMENTS

To make the objectives, the technical solutions, and the advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality of" means two or more than two.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that With evolution of the network architecture and emergence of new service scenarios, the technical solutions provided in the embodiments of this application are also applicable to similar technical problems.

Figure 1:
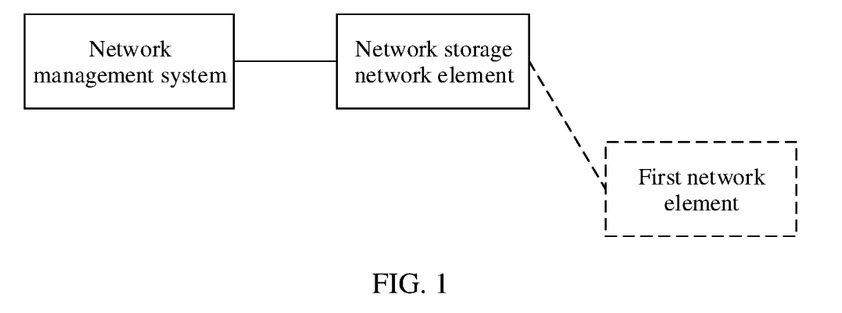
FIG. 1 is a schematic diagram of a possible network architecture according to this application.

FIG. 1 is a schematic diagram of a possible network architecture to which this application is applicable. The network architecture includes a network management system and a network storage network element. Optionally, the network architecture may further include a first network element.

The network management system may be, for example, an operation, administration, and maintenance (OAM) entity, and is mainly used for operations and management of network operation and maintenance, network element deployment, undeployment, and status detection, and the like.

The network storage network element may be, for example, a network repository function (NRF) network element in a 5th generation (5G) communications system. Functions of the network storage network element mainly include registration, deregistration, discovery, and the like of a network function and a service. The network storage network element may store description information of a deployed network function, for example, an identifier and an address of the network function, supported service information, a network slice identifier, and information about a served network area. In future communications, the network storage network element may be the NRF network element, or may have another name. This is not limited in this application.

The first network element may be a user plane network element in a core network, for example, a user plane function (UPF) network element, or may be a control plane network element in a core network, for example, an access and mobility management function (AMF) network element, a session management function (SMF) network element, or a policy control function (PCF) network element.

It may be understood that the foregoing functions may be network elements in a hardware device, software functions running on dedicated hardware, or virtualized functions instantiated on a platform (for example, a cloud platform).

In this application, a concept of a network function region is introduced. One network function region corresponds to one or more service regions (service region). When service regions served by network elements of one or more types are the same as a service region corresponding to one network function region, the network element may belong to the network function region, and the service region served by the network element is the service region corresponding to the network function region. Specifically, service regions served by network elements deployed in a same data center may be the same. In this case, these network elements may belong to a same network function region, and the service region may be, for example, a network tracking area.

Figure 2:
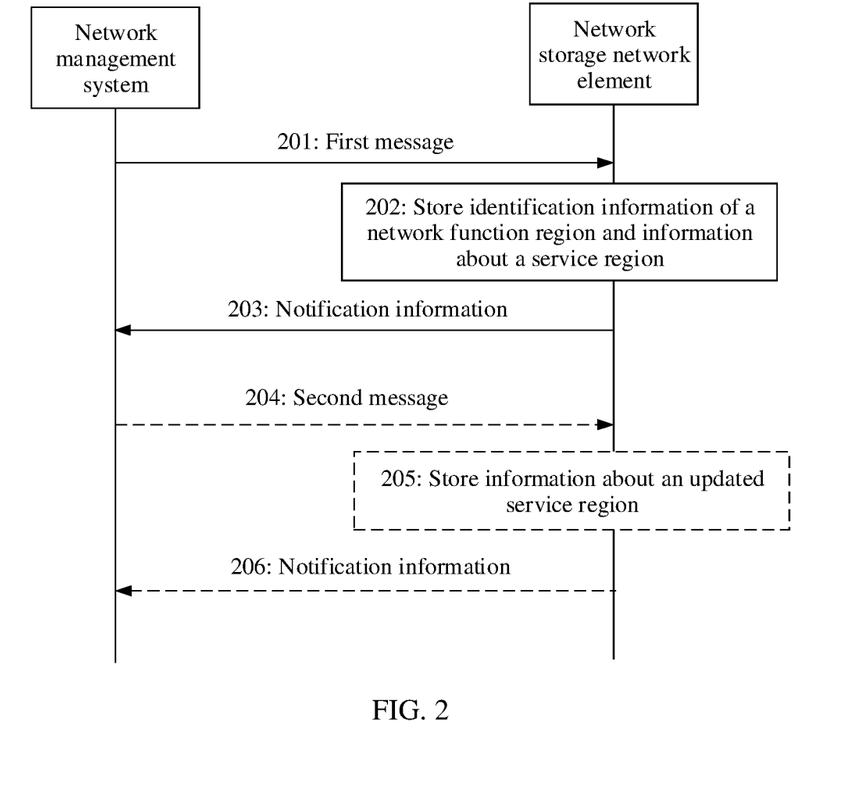
FIG. 2 is a flowchart of a service region management method according to this application.
Figure 3:
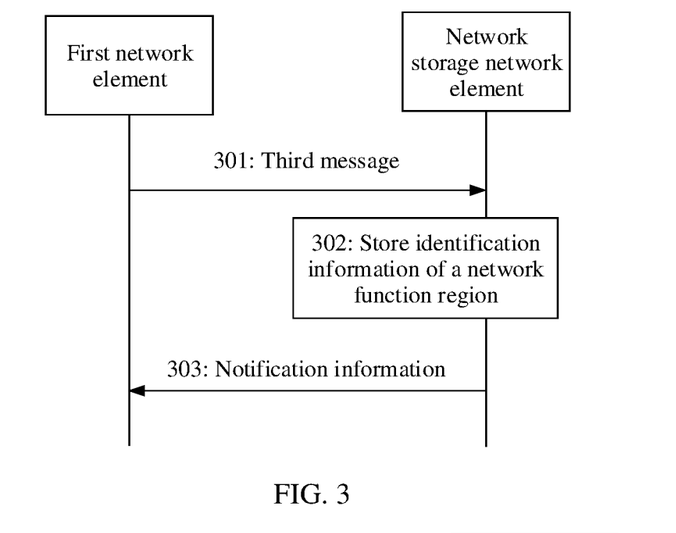
FIG. 3 is a flowchart of another service region management method according to this application.
Figure 4:
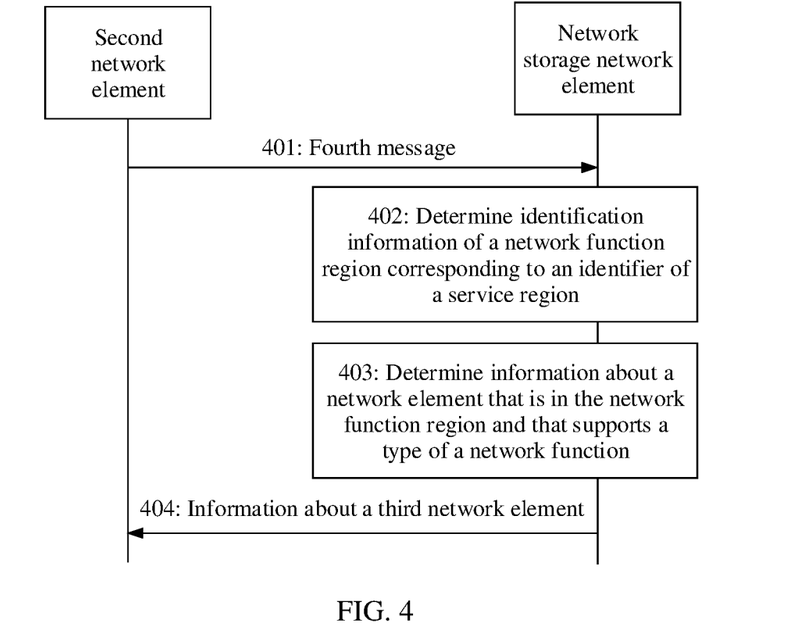
FIG. 4 is a flowchart of another service region management method according to this application.

Based on the network architecture shown in FIG. 1, a service region management method provided in this application is shown in FIG. 2 to FIG. 4.

It should be noted that in this application, a first message, a second message, a third message, and a fourth message may be request messages, or may be service-oriented invocations. Unified description is provided herein.

FIG. 2 is a flowchart of a service region management method according to this application. The method includes the following steps.

Step 201: A network management system sends a first message to a network storage network element, where the first message includes identification information of a network function region and information about a service region corresponding to the network function region, and the first message is used to request to register the network function region. Correspondingly, the network storage network element receives the first message.

Step 202: The network storage network element stores the identification information of the network function region and the information about the service region.

For example, the network storage network element may store a correspondence between the identification information of the network function region and the information about the service region.

In an implementation, the information about the service region may be identification information of one or more tracking areas (TA). That is, one network function region corresponds to one or more service regions.

For example, if the network storage network element stores, in a form of a table, the identification information of the network function region and the information about the service region, Table 1 may be used as an example for description.

TABLE 1

| Identification information of a network function region | Information about a service region |
|---|---|
| NFR 1 | TA 1, TA 2, and TA 3 |
| NFR 2 | TA 4, TA 5, and TA 6 |

NFR 1 indicates identification information of a network function region 1, and TA 1, TA 2, and TA 3 are respectively used to indicate identification information of a service region 1, identification information of a service region 2, and identification information of a service region 3. NFR 2 indicates identification information of a network function region 2, and TA 4, TA 5, and TA 6 are respectively used to indicate identification information of a service region 4, identification information of a service region 5, and identification information of a service region 6.

If the identification information of the network function region and the information about the service region that are included in the first message in step 201 are NFR 3 and TA 7, TA 8, and TA 9, the network storage network element may register a network function region 3 after receiving the first message. In other words, Table 1 may be updated to obtain Table 2, to implement registration of the network function region 3.

TABLE 2

| Identification information of a network function region | Information about a service region |
|---|---|
| NFR 1 | TA 1, TA 2, and TA 3 |
| NFR 2 | TA 4, TA 5, and TA 6 |
| NFR 3 | TA 7, TA 8, and TA 9 |

NFR 3 indicates identification information of the network function region 3, and TA 7, TA 8, and TA 9 are respectively used to indicate identification information of a service region 7, identification information of a service region 8, and identification information of a service region 9.

Step 203: The network storage network element sends notification information to the network management system, where the notification information is used to notify that registration of the network function region is completed. Correspondingly, the network management system receives the notification information from the network storage network element.

Using the foregoing example as an example, after completing the registration of the network function region 3, the network storage network element may send the notification information to the network management system, to notify the network management system that the registration of the network function region 3 is completed.

Through step 201 to step 203, the network management system sends the first message to the network storage network element, to request to register the network function region with the network storage network element, so that the network storage network element manages the network function region and the service region corresponding to the network function region. Therefore, the identification information of the network function region can be subsequently used to indicate one or more service regions corresponding to the network function region, thereby simplifying a service region management manner.

Further, if a network administrator needs to update the information about the service region corresponding to the network function region, the network administrator may update the information about the service region corresponding to the network function region by using the network management system. Therefore, after step 203, the method may further include the following step 204 to step 206.

Step 204: The network management system sends a second message to the network storage network element, where the second message includes the identification information of the network function region and information about an updated service region corresponding to the network function region, and the second message is used to request to update the network function region. Correspondingly, the network storage network element receives the second message.

Step 205: The network storage network element stores the identification information of the network function region and the information about the updated service region.

Using Table 2 as an example, assuming that the network administrator needs to update service regions corresponding to the network function region 3 to the service region 7, the service region 8, the service region 9, and a service region 10, the network administrator may send the second message to the network storage network element by using the network management system, where the second message includes NFR 3 and TA 7, TA 8, TA 9, and TA 10. After receiving the second message, the network storage network element may update Table 2 to obtain Table 3.

TABLE 3

| Identification information of a network function region | Information about a service region |
|---|---|
| NFR 1 | TA 1, TA 2, and TA 3 |
| NFR 2 | TA 4, TA 5, and TA 6 |
| NFR 3 | TA 7, TA 8, TA 9, and TA 10 |

Step 206: The network storage network element sends the notification information to the network management system, where the notification information is used to notify that registration of the network function region is completed. Correspondingly, the network management system receives the notification information from the network storage network element.

Using the foregoing example as an example, after completing update for the network function region 3, the network storage network element may send the notification information to the network management system, to notify the network management system that the update for the network function region 3 is completed.

Through step 204 to step 206, the network management system sends the second message to the network storage network element, to request to update the service region corresponding to the network function region, so that the network storage network element manages the network function region and the service region corresponding to the network function region.

FIG. 3 is a flowchart of a service region management method according to this application. The embodiment shown in FIG. 3 is used to register a first network element with a network storage network element. Optionally, the embodiment shown in FIG. 3 may further be implemented with reference to the embodiment shown in FIG. 2. The method includes the following steps.

Step 301: The first network element sends a third message to the network storage network element, where the third message includes identification information of a network function region to which the first network element belongs, and the third message is used to request to register the first network element. Correspondingly, the network storage network element may receive the third message.

In an implementation, the first network element may obtain, through the following method, the identification information of the network function region to which the first network element belongs: A network management system may determine, based on a data center in which the first network element is deployed and a network function region corresponding to a network element in the data center, the identification information of the network function region to which the first network element belongs, and place the identification information of the network function region in description information (network function profile) of the first network element. In other words, the first network element may obtain, from the network management system, the identification information of the network function region to which the first network element belongs.

In an implementation, the third message may further include one or more of a type of a network function (NF), address information of the first network element, and information about a network slice supported by the first network element. The type of the NF is used to identify a type of the first network element. For example, when the first network element is an AMF network element, the type of the NF is used to identify that the first network element is an AMF network element. For another example, when the first network element is an SMF network element, the type of the NF is used to identify that the first network element is an SMF network element.

Step 302: The network storage network element stores the identification information of the network function region.

For example, if the third message sent by the first network element to the network storage network element includes identification information of a network function region 3, that is, NFR 3, the network storage network element stores information about the first network element after receiving a request of the first network element, where the information about the first network element includes NFR 3.

Step 303: The network storage network element sends notification information to the first network element, where the notification information is used to notify that registration of the first network element is completed. Correspondingly, the first network element may receive the notification information.

Based on this solution, when the first network element intends to register with the network storage network element, the identification information of the network function region may be carried in the third message, and then the network function region stores the identification information of the network function region of the first network element, to complete registration of the first network element. The third message carries the identification information of the network function region, and does not need to carry information about one or more service regions served by the network element. Therefore, a registration procedure of the first network element can be simplified, and a manner of managing a service region by the network storage network element can further be simplified.

It should be noted that, when the embodiment shown in FIG. 3 is combined with the embodiment shown in FIG. 2, the network storage network element may complete registration of the network function region on the one hand, and may complete registration of the first network element on the other hand. Therefore, on the one hand, the network storage network element stores a correspondence between the identification information of the network function region and information about a service region corresponding to the network function region. On the other hand, the network storage network element further stores the network function region to which the first network element belongs.

In the prior art, a method used by the first network element to perform registration with the network storage network element is as follows. The first network element sends a registration request message to the network storage network element, where the registration request message includes information about a service region in which the first network element can provide a service. For example, if service regions in which the first network element can provide a service are a service region 7, a service region 8, a service region 9, and a service region 10, the registration request message includes TA 7, TA 8, TA 9, and TA 10, where TA 7, TA 8, TA 9 and TA 10 are respectively identification information of the service region 7, the service region 8, the service region 9, and the service region 10. The prior art has the following problems. When sending the registration request message to the network storage network element, each first network element needs to carry information about a service region in which the first network element can provide a service. If there are a relatively large quantity of first network elements, or if there are a relatively large quantity of service regions in which the first network element can provide a service, each first network element needs to carry a large amount of information about the service region in the registration request message. Consequently, overheads of the registration request message increase. In addition, when performing storage, the network storage network element also needs to store the information about the service region in which each first network element can provide a service, which also increases storage overheads of the network storage network element. The following provides description with reference to specific examples.

For example, there are 100 first network elements, and service regions in which each first network element can provide a service are a service region 1 to a service region 100. In this case, on the one hand, when sending the registration request message to the network storage network element, each first network element needs to carry identification information of the service region 1 to the service region 100. Consequently, overheads of each registration request message are relatively high. On the other hand, the network storage network element needs to store the identification information of the service regions of each first network element, that is, store 100 copies of the identification information of the service region 1 to the service region 100. Consequently, storage overheads are relatively high, repeated storage is performed, and storage efficiency is low.

However, if the method shown in FIG. 3 of this application is used, the registration request messages (that is, second messages) sent by the 100 first network elements only need to carry identification information of a network function region to which the service region 1 to the service region 100 belong. For example, if service regions corresponding to a network function region 4 are the service region 1 to the service region 100, the registration request message may carry identification information of the network function region 4, so that overheads of the registration request message can be reduced. In addition, the network function region 4 may be registered in advance through the method in the embodiment shown in FIG. 2, so that the network storage network element needs to store only one correspondence between the identification information of the network function region 4 and the identification information of the service region 1 to the service region 100. Therefore, storage overheads of the network storage network element can be reduced.

FIG. 4 is a flowchart of another service region management method according to this application. Optionally, the embodiment shown in FIG. 4 may further be implemented with reference to the embodiment shown in FIG. 2, or with reference to the embodiments shown in FIG. 2 and FIG. 3. The method includes the following steps.

Step 401: A second network element sends a fourth message to a network storage network element, where the fourth message includes a type of a network function and information about a service region, and the fourth message is used to request to obtain information about a network element that serves the service region and that supports the type of the network function. Correspondingly, the network storage network element may receive the fourth message.

The second network element herein may be the first network element in the embodiment shown in FIG. 3, or may be another network element. This is not limited in this application.

For example, the second network element is an AMF network element. If the AMF network element intends to request to obtain information about an SMF network element, the AMF network element may send the fourth message to the network storage network element. The fourth message includes the type of the network function and the information about the service region, the type of the network function is used to indicate the SMF, and the information about the service region is used to indicate a service region in which the SMF to be obtained can provide a service. It may be understood that the AMF network element requests the network storage network element to search for and return, to the AMF network element, the information about the SMF network element that can provide a service in the service region.

Step 402: The network storage network element determines identification information of a network function region corresponding to an identifier of the service region.

Step 403: The network storage network element determines, based on the identification information of the network function region, information about a network element that is in the network function region and that supports the type of the network function.

The network storage network element stores the information shown in Table 4. Specifically, through the method in the embodiment shown in FIG. 2, a correspondence between the network function region and the service region may be configured on the network storage network element.

For example, if the information about the service region that is included in the fourth message in step 401 is TA 8, the network storage network element may determine that identification information of a network function region corresponding to TA 8 is NFR 3.

Further, for the first network element, the network storage network element may search a network function region 3 identified by NFR 3 for information about a network element that can support the type of the network function, for example, search the network function region 3 for an SMF network element. If one or more SMF network elements are found, information about the one or more SMF network elements may be sent to the first network element.

Step 404: The network storage network element sends information about a third network element to the second network element, where the third network element is the network element that is in the network function region and that supports the type of the network function. Correspondingly, the second network element may receive the information about the third network element.

In an implementation, the information about the third network element may be specifically address information of the third network element or the like.

The third network element herein may be the first network element in the embodiment shown in FIG. 3, or may be another network element. This is not limited in this application. When the third network element is the first network element, information about the first network element may be registered with the network storage network element through the method in the embodiment shown in FIG. 3. The information about the first network element herein includes information about a network function region to which the third network element belongs.

Based on this solution, when the second network element intends to request to obtain the information about the network element that serves the service region and that supports the type of the network function, the second network element may send the fourth message to the network storage network element, where the fourth message includes the type of the network function and the information about the service region. Therefore, the network storage network element may obtain, based on the type of the network function and the information about the service region, the information about the network element that serves the service region and that supports the type of the network function, and send the information to the second network element.

Figure 5:
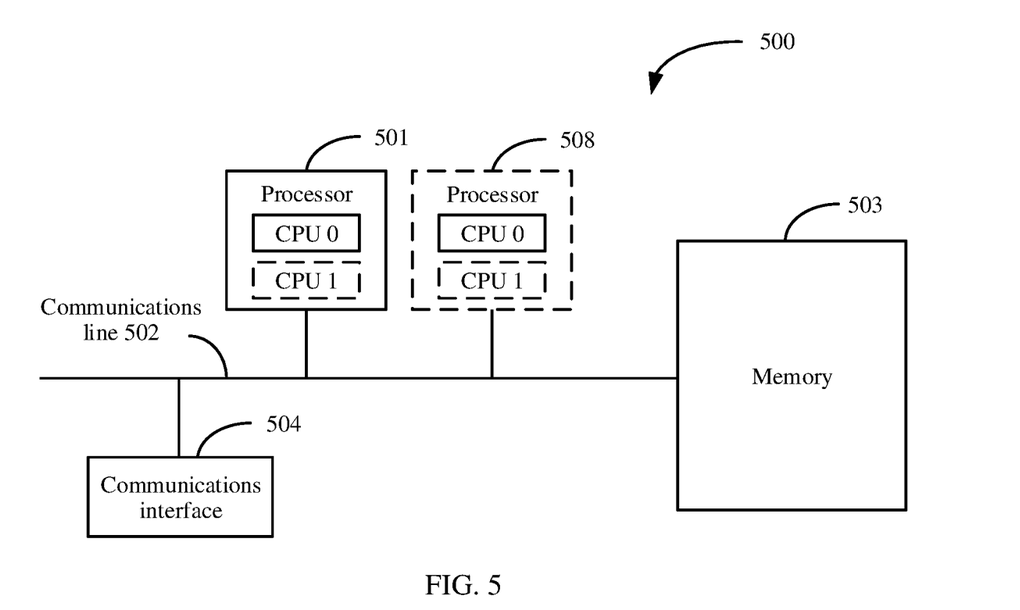
FIG. 5 is a schematic diagram of an apparatus according to this application.

Based on a same inventive concept, FIG. 5 is a schematic diagram of an apparatus according to this application. The apparatus may be a network management system, a network storage network element, a first network element, a second network element, or a chip, and may perform the method in any one of the foregoing embodiments. When the apparatus is a network management system or a chip, the apparatus 500 may be configured to perform an operation performed by the network management system in the embodiment shown in FIG. 2. When the apparatus is a network storage network element or a chip, the apparatus 500 may be configured to perform operations performed by the network storage network element in the embodiments shown in FIG. 2 to FIG. 4. When the apparatus is a first network element or a chip, the apparatus 500 may be configured to perform an operation performed by the first network element in the embodiment shown in FIG. 3. When the apparatus is a second network element or a chip, the apparatus 500 may be configured to perform an operation performed by the second network element in the embodiment shown in FIG. 4.

The apparatus 500 includes at least one processor 501, a communications line 502, a memory 503, and at least one communications interface 504.

The processor 501 may be a general-purpose central processing unit (CPU), a microprocessor, an application-specific integrated circuit (ASIC), or one or more integrated circuits configured to control program execution of the solutions of this application.

The communications line 502 may include a path for transmitting information between the foregoing components.

The communications interface 504 uses any apparatus like a transceiver, and is configured to communicate with another device or a communications network, such as the Ethernet, a radio access network (RAN), a wireless local area network (WLAN), or a wired access network.

The memory 503 may be a read-only memory (ROM) or another type of static storage device capable of storing static information and an instruction, or a random access memory (RAM) or another type of dynamic storage device capable of storing information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage device, or any other medium capable of carrying or storing expected program code in a form of an instruction or a data structure and capable of being accessed by a computer. However, the memory is not limited thereto. The memory may exist independently, and is connected to the processor by using the communications line 502. Alternatively, the memory may be integrated with the processor.

The memory 503 is configured to store a computer-executable instruction for executing the solutions of this application, and the processor 501 controls the execution of the computer-executable instruction. The processor 501 is configured to execute the computer-executable instruction stored in the memory 503, to implement the service region management method provided in the foregoing embodiments of this application.

Optionally, the computer-executable instruction in this embodiment of this application may also be referred to as application program code, and this is not specifically limited in this embodiment of this application.

During specific implementation, in an embodiment, the processor 501 may include one or more CPUs, such as a CPU 0 and a CPU 1 in FIG. 5.

During specific implementation, in an embodiment, the apparatus 500 may include a plurality of processors, for example, the processor 501 and a processor 505 shown in FIG. 5. Each of the processors may be a single-core processor (single-CPU) or a multi-core processor (multi-CPU).

The processors herein may be one or more devices, circuits, and/or processing cores for processing data (for example, a computer program instruction).

When the apparatus shown in FIG. 5 is a chip, for example, a chip in a network management system, a chip in a network storage network element, a chip in a first network element, or a chip in a second network element, the chip includes the processor 501 (and may further include the processor 505), the communications line 502, the memory 503, and the communications interface 504. Specifically, the communications interface 504 may be an input interface, a pin, a circuit, or the like. The memory 503 may be a register, a cache, or the like. The processor 501 and the processor 505 each may be a general-purpose CPU, a microprocessor, an ASIC, or one or more integrated circuits configured to control program execution of the service region management method in any one of the foregoing embodiments.

Figure 6:
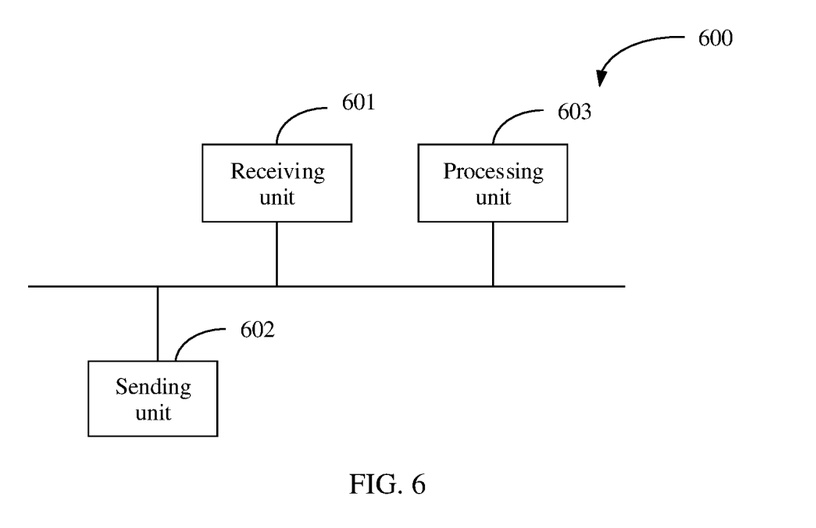
FIG. 6 is a schematic diagram of another apparatus according to this application.

In this application, functional modules in the apparatus may be obtained through division based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used. For example, when functional modules are obtained through division based on corresponding functions, FIG. 6 is a schematic diagram of an apparatus. The apparatus 600 may be the network management system in the foregoing embodiments, or the network storage network element in the foregoing embodiments, or the first network element in the foregoing embodiments, or the second network element in the foregoing embodiments, or a chip in the network management system, or a chip in the network storage network element, or a chip in the first network element, or a chip in the second network element. The apparatus 600 includes a receiving unit 601, a sending unit 602, and a processing unit 603.

In an embodiment, when the apparatus 600 is the network management system in the foregoing embodiments or a chip in the network management system, the sending unit 602 is configured to send a first message to a network storage network element, where the first message includes identification information of a network function region and information about a service region corresponding to the network function region, and the first message is used to request to register the network function region, and the receiving unit 601 is configured to receive notification information from the network storage network element, where the notification information is used to notify that registration of the network function region is completed.

In an implementation, the sending unit 602 is further configured to send a second message to the network storage network element, where the second message includes the identification information of the network function region and information about an updated service region corresponding to the network function region, and the second message is used to request to update the network function region.

In an implementation, the information about the service region includes identification information of at least one tracking area.

In another embodiment, when the apparatus 600 is the network storage network element in the foregoing embodiments or a chip in the network storage network element, the receiving unit 601 is configured to receive a first message from a network management system, where the first message includes identification information of a network function region and information about a service region corresponding to the network function region, and the first message is used to request to register the network function region, the processing unit 603 is configured to store the identification information of the network function region and the information about the service region, and the sending unit 602 is configured to send notification information to the network management system, where the notification information is used to notify that registration of the network function region is completed.

In an implementation, the receiving unit 6o*i* is further configured to receive a second message from the network management system, where the second message includes the identification information of the network function region and information about an updated service region corresponding to the network function region, and the second message is used to request to update the network function region, and the processing unit 603 is further configured to store the information about the updated service region.

In an implementation, the information about the service region includes identification information of at least one tracking area.

In another embodiment, when the apparatus 600 is the network storage network element in the foregoing embodiments or a chip in the network storage network element, the receiving unit 601 is configured to receive a third message from a first network element, where the third message includes identification information of a network function region to which the first network element belongs, and the third message is used to request to register the first network element, the processing unit 603 is configured to store the identification information of the network function region, and the sending unit 602 is configured to send notification information to the first network element, where the notification information is used to notify that registration of the first network element is completed.

In an implementation, the receiving unit 601 is further configured to receive a fourth message from a second network element, where the fourth message includes a type of a network function and information about a service region, and the fourth message is used to request to obtain information about a network element that serves the service region and that supports the type of the network function, the processing unit 603 is further configured to determine identification information of a network function region corresponding to an identifier of the service region, and determine, based on the identification information of the network function region, information about a network element that is in the network function region and that supports the type of the network function, and the sending unit 602 is further configured to send information about a third network element to the second network element, where the third network element is the network element that is in the network function region and that supports the type of the network function.

In another embodiment, when the apparatus 600 is the first network element in the foregoing embodiments or a chip in the first network element, the sending unit 602 is configured to send a third message to a network storage network element, where the third message includes identification information of a network function region to which the first network element belongs, and the third message is used to request to register the first network element, and the receiving unit 601 is configured to receive notification information from the network storage network element, where the notification information is used to notify that registration of the first network element is completed.

In another embodiment, when the apparatus 600 is the second network element in the foregoing embodiments or a chip in the second network element, the sending unit 602 is configured to send a fourth message to a network storage network element, where the fourth message includes a type of a network function and information about a service region, and the fourth message is used to request to obtain information about a network element that serves the service region and that supports the type of the network function, and the receiving unit 601 is configured to receive information about a third network element from the network storage network element, where the third network element is the network element that serves the service region and that supports the type of the network function.

It should be understood that the apparatus may be configured to implement the steps performed by the network management system, the network storage network element, the first network element, and the second network element in the method in the embodiments of the present invention. For related features, refer to the foregoing description. Details are not described herein again.

Specifically, functions/implementation processes of the receiving unit 601, the processing unit 603, and the sending unit 602 in FIG. 6 may be implemented by the processor 501 in FIG. 5 by invoking a computer-executable instruction stored in the memory 503. Alternatively, a function/an implementation process of the processing unit 603 in FIG. 6 may be implemented by the processor 501 in FIG. 5 by invoking a computer-executable instruction stored in the memory 503, and functions/implementation processes of the receiving unit 601 and the sending unit 602 in FIG. 6 may be implemented through the communications interface 504 in FIG. 5.

Optionally, when the apparatus 600 is a chip or a circuit, functions/implementation processes of the receiving unit 601 and the sending unit 602 may alternatively be implemented by a pin, a circuit, or the like. Optionally, when the apparatus 600 is a chip, the memory 503 may be a storage unit in the chip, for example, a register or a cache. Certainly, when the apparatus 600 is a network management system, for example, the network management system in the foregoing embodiments, the memory 503 may be a storage unit that is located outside a chip and that is in the network management system. This is not specifically limited in this embodiment of this application. When the apparatus 600 is a network storage network element, the memory 503 may be a storage unit that is located outside a chip and that is in the network storage network element. This is not specifically limited in this embodiment of this application. When the apparatus 600 is a first network element, the memory 503 may be a storage unit that is located outside a chip and that is in the first network element. This is not specifically limited in this embodiment of this application. When the apparatus 600 is a second network element, the memory 503 may be a storage unit that is located outside a chip and that is in the second network element. This is not specifically limited in this embodiment of this application.

This application further provides a system. The system includes the network management system and the network storage network element in the embodiment shown in FIG. 2. Further, the system may further include the first network element in the embodiment shown in FIG. 3. Further, the system may further include the second network element in the embodiment shown in FIG. 4.

This application further provides another system. The system includes the first network element and the network storage network element in the embodiment shown in FIG. 3. Further, the system may further include the second network element in the embodiment shown in FIG. 4.

This application further provides another system. The system includes the second network element and the network storage network element in the embodiment shown in FIG. 4.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may further be integrated into the processor. The processor and the storage medium may be disposed in an ASIC, and the ASIC may be disposed in a terminal device. Optionally, the processor and the storage medium may also be disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, definitely, various modifications and combinations may be made to them without departing from the spirit and scope of the present invention. Correspondingly, the specification and the accompanying drawings are merely example description of the present invention defined by the accompanying claims, and are considered as any of or all modifications, variations, combinations or equivalents that cover the scope of the present invention. Definitely, a person skilled in the art can make various modifications and variations to the present invention without departing from the spirit and scope of the present invention. In this way, if these modifications and variations of the present invention fall within the scope of the claims of the present invention and their equivalent technologies, the present invention is also intended to cover these modifications and variations.

What is claimed is:

1. A service region management method, comprising:
   sending, by a first network element, a third message to a network storage network element, wherein the first network element is configured to provide network functionality, wherein the third message comprises identification information of a network function region to which the first network element belongs, and wherein the third message requests to register the first network element; and
   receiving, by the network storage network element, the third message;
   storing, by the network storage network element, the identification information of the network function region;
   sending, by the network storage network element, notification information to the first network element, wherein the notification information notifies that registration of the first network element is completed;
   receiving, by the first network element, the notification information;
   sending, by a second network element, a fourth message to a network storage network element, wherein the fourth message comprises a type of a network function and further comprises information about a service region, and wherein the fourth message requests to obtain information about a fourth network element that serves the service region and that supports the type of the network function;
   receiving, by the network storage network element, the fourth message;
   determining, by the network storage network element, identification information of a network function region corresponding to an identifier of the service region;
   determining, by the network storage network element, according to the identification information of the network function region, information about a third network element that serves the network function region and that supports the type of the network function;

sending, by the network storage network element, information about the third network element to the second network element; and receiving, by the second network element, the information about the third network element.

2. The method of claim 1, further comprising:

receiving, by the network storage element, a second message comprising the identification information of the network function region and information about an updated service region corresponding to the network function region, wherein the second message indicates that the network function region needs to be updated with the updated service region; and updating, by the network storage network element, a data entry associated with the identification information of the network function region according to the information about the updated service region.

3. The method according to claim 2, wherein the information about the service region comprises identification information of at least one first tracking area; and wherein the updating the data entry associated with the identification information of the network function region according to the information about the updated service region comprises changing the at least one tracking first area according to one or more second tracking areas of the information about the updated service region.

4. The method of claim 1, wherein the second network element is at least one of a user plane function (UPF) network element, an access and mobility management function (AMF) network element, a session management function (SMF) network element, or a policy control function (PCF) network element.

5. The method of claim 4, wherein the second network element is the AMF network element, and wherein the type of the network function indicate an SMF.

6. A communications system, comprising:

a first network element configured to provide network functionality;

a network storage network element; and a second network element;

wherein the first network element is further configured to:
send a third message to a network storage network element, wherein the third message comprises identification information of a network function region to which the first network element belongs, and wherein the third message requests to register the first network element; and wherein the network storage network element is configured to:
receive the third message;
store the identification information of the network function region; and
send notification information to the first network element, wherein the notification information notifies that registration of the first network element is completed;

wherein the first network element is further configured to:
receive the notification information;

wherein the second network element is configured to:
send a fourth message to the network storage network element, wherein the fourth message comprises a type of a network function and information about a service region, and wherein the fourth message requests to obtain information about a fourth network element that serves the service region and that supports the type of the network function;

wherein the network storage network element is further configured to:
receive the fourth message;
determine identification information of a network function region corresponding to an identifier of the service region;
determine, according to the identification information of the network function region, information about a third network element that serves the network function region and that supports the type of the network function; and
send information about the third network element to the second network element; and wherein the second network element is further configured to:
receive the information about the third network element.

7. The system of claim 6, wherein the network storage element is further configured to:

receive a second message comprising the identification information of the network function region and information about an updated service region corresponding to the network function region, wherein the second message indicates that the network function region needs to be updated with the updated service region; and update a data entry associated with the identification information of the network function region according to the information about the updated service region.

8. The system according to claim 7, wherein the information about the service region comprises identification information of at least one first tracking area; and wherein the network storage element being configured to update the data entry associated with the identification information of the network function region according to the information about the updated service region comprises the network storage element being configured to change the at least one tracking first area according to one or more second tracking areas of the information about the updated service region.

9. The system of claim 6, wherein the first network element is at least one of a user plane function (UPF) network element, an access and mobility management function (AMF) network element, a session management function (SMF) network element, or a policy control function (PCF) network element.

10. The system of claim 9, wherein the first network element is the AMF network element, and wherein the type of the network function indicate an SMF.

* * * * *